(12) United States Patent
Masaki, I

(10) Patent No.: US 8,613,334 B2
(45) Date of Patent: Dec. 24, 2013

(54) GAS CONSUMING SYSTEM, FUEL CELL SYSTEM AND VEHICLE

(75) Inventor: Daisuke Masaki, I, Kariya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 41 days.

(21) Appl. No.: 13/499,646

(22) PCT Filed: Jun. 3, 2010

(86) PCT No.: PCT/JP2010/003711
§ 371 (c)(1),
(2), (4) Date: Mar. 30, 2012

(87) PCT Pub. No.: WO2011/151863
PCT Pub. Date: Dec. 8, 2011

(65) Prior Publication Data
US 2012/0181098 A1    Jul. 19, 2012

(51) Int. Cl.
*B60K 6/32* (2007.10)

(52) U.S. Cl.
USPC .................. 180/65.31; 903/908; 429/434

(58) Field of Classification Search
USPC ............. 180/65.31, 68.2, 65.6; 903/908, 951, 903/952; 429/434, 437, 439, 534
See application file for complete search history.

(56) References Cited

U.S. PATENT DOCUMENTS

| | | | | |
|---|---|---|---|---|
| 6,223,844 | B1 * | 5/2001 | Greenhill et al. | 429/429 |
| 7,211,913 | B2 * | 5/2007 | Tsutsui et | 310/54 |
| 7,255,945 | B2 * | 8/2007 | Enjoji et al. | 429/437 |
| 7,682,717 | B2 * | 3/2010 | Ueda et al. | 429/437 |

FOREIGN PATENT DOCUMENTS

| | | |
|---|---|---|
| JP | 2005-346949 A | 12/2005 |
| JP | 2007-035480 A | 2/2007 |
| JP | 2007-073378 A | 3/2007 |
| JP | 2007-165088 A | 6/2007 |
| JP | 2010-021005 A | 1/2010 |

OTHER PUBLICATIONS

International Search Report issued Aug. 24, 2010 in PCT/JP2010/003711.

* cited by examiner

*Primary Examiner* — John Walters
(74) *Attorney, Agent, or Firm* — Kenyon & Kenyon LLP

(57) ABSTRACT

In a fuel cell system, a compressor used for supply of a gas and a motor are arranged to be opposed to each other across a transmission mechanism, such that a motor driveshaft is placed to face rotating shafts of the compressor. Such opposed arrangement enables the motor and the compressor to be relatively close to each other across only a narrow distance required for the transmission mechanism. Additionally, a circulation pump used for supply of a coolant is placed, such that the motor driving force is transmitted from the motor driveshaft to the circulation pump directly or via the transmission mechanism.

8 Claims, 9 Drawing Sheets

Fig.4
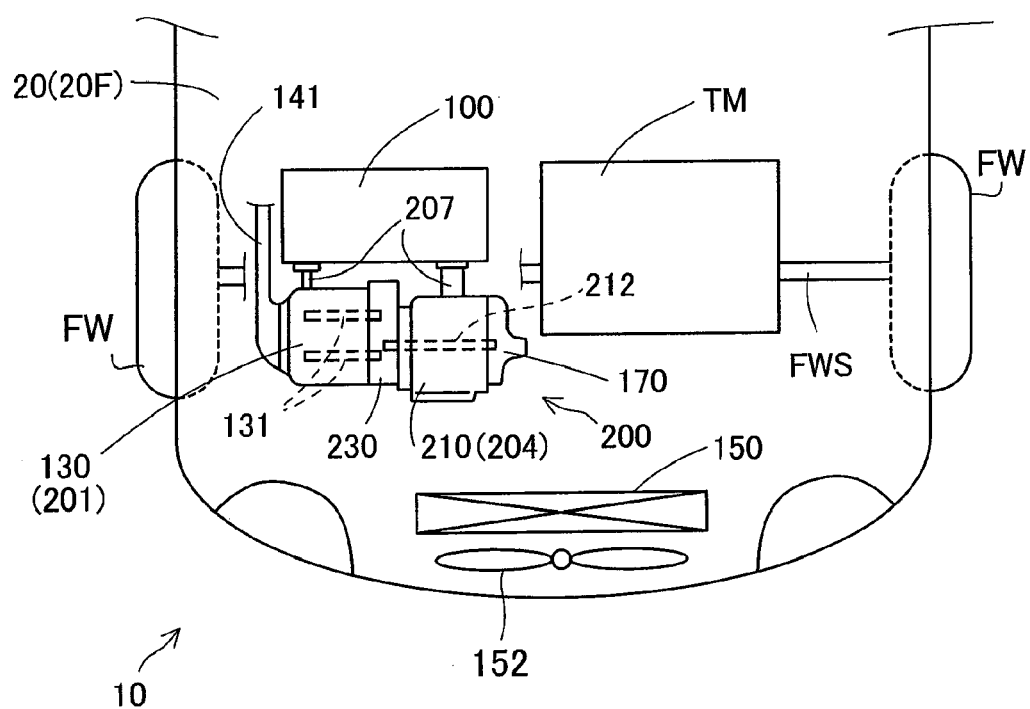
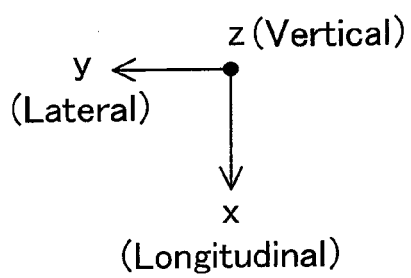

Fig.11
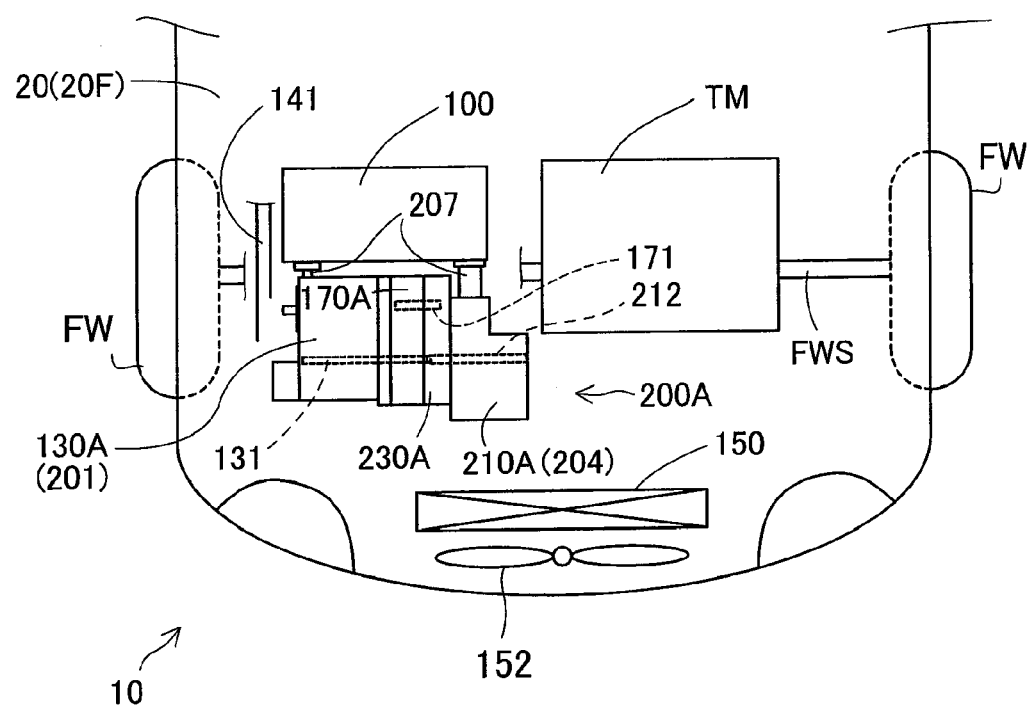
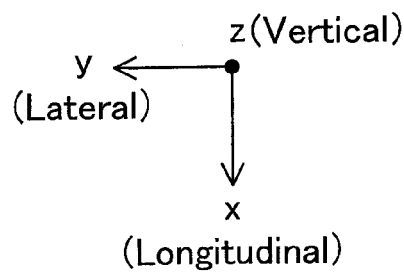

GAS CONSUMING SYSTEM, FUEL CELL SYSTEM AND VEHICLE

This is a 371 national phase application of PCT/JP2010/003711 filed 03 Jun. 2010, the contents of which are incorporated herein by reference.

BACKGROUND

1. Technical Field

The present invention relates to a gas consuming system including a gas consuming device that consumes supplied gas, a fuel cell system including a fuel cell that generates electric power while consuming supplied fuel gas and oxidizing gas, and a vehicle equipped with the fuel cell system.

2. Background Art

In a fuel cell as one typical example of the gas consuming device that consumes supplied gas, for example, in a polymer electrolyte fuel cell, reactive gases (fuel gas an oxidizing gas, e.g., the air) are supplied to a pair of electrodes (anode and cathode) arranged across an electrolyte membrane. The fuel cell generates electric power, as the electrochemical reaction proceeds with consuming the supplied reactive gases. The continuous gas supply according to the power demand is essential for the progress of the electrochemical reaction. This electrochemical reaction is an exothermic reaction, so that it is generally required to cool down the fuel cell with a coolant, such as water, for continuation of the smooth reaction. For this purpose, a compressor for compressing and supplying the intake outside air and a water pump for pressure-feeding water are generally provided with the fuel cell.

SUMMARY

Recently, with the increased environmental consciousness, fuel cells have drawn attention as the clean energy source, and installation of fuel cells to vehicles and to power generation facilities has been grooving availability. In installation of fuel cells to vehicles or to power generation facilities, however, there is still room for improvement in size reduction and easy installation by taking into account the requirement for providing a compressor, a water pump and their driving motor with the fuel cell.

This problem is not characteristic of the fuel cell system but is commonly found in gas consuming systems including gas consuming devices that require cooling.

Consequently, in order to address the problem described above, there is a need to allow for size reduction of a gas consuming system including a compressor, a water pump and their driving motor.

In order to achieve at least part of the foregoing, the present invention provides various aspects and embodiments described below.

One aspect of a gas supply system configured to supply a gas to a gas consuming device; and a cooling system configured to circulate a coolant through a coolant flow path passing through the gas consuming device and cool down the gas consuming device by the circulated coolant. The gas consuming system comprises: a gas supply device included in the gas supply system and provided to have a rotary member rotating for supply of the gas; a coolant supply device included in the cooling system and provided to have a rotary member rotating for circulation of the coolant; and a motor provided as a common driving source for the gas supply device and the coolant supply device, wherein the motor and the gas supply device are arranged to be opposed to each other across a transmission mechanism provided to transmit a driving force of the motor to the gas supply device, such that a motor driveshaft of the motor is located to face the rotary member of the gas supply device, and the coolant supply device is placed to transmit the driving force of the motor from the motor driveshaft of the motor to the coolant supply device directly or via the transmission mechanism.

One aspect of a fuel cell configured to generate electric power while consuming a supplied fuel gas and a supplied oxygen-containing oxidizing gas; gas supply systems for both the fuel gas and the oxidizing gas; and a cooling system configured to circulate a coolant through a coolant flow path passing through the fuel cell and cool down the fuel cell by the circulated coolant. The fuel cell system comprises: a gas supply device included in an oxidizing gas supply system or supply system of the oxidizing gas and provided to have a rotary member rotating for supply of the oxidizing gas; a coolant supply device included in the cooling system and provided to have a rotary member rotating for circulation of the coolant; and a motor provided as a common driving source for the gas supply device and the coolant supply device, wherein the motor and the gas supply device are arranged to be opposed to each other across a transmission mechanism provided to transmit a driving force of the motor to the gas supply device, such that a motor driveshaft of the motor is located to face the rotary member of the gas supply device, and the coolant supply device is placed to transmit the driving force of the motor from the motor driveshaft of the motor to the coolant supply device directly or via the transmission mechanism.

In the gas consuming system and the fuel cell system according to the above aspects, the motor and the gas supply device are arranged to be opposed to each other across the transmission mechanism, such that the motor driveshaft is placed to face the rotary member of the gas supply device. Such opposed arrangement enables the motor and the gas supply device to be relatively close to each other across only a narrow distance required for the transmission mechanism. Additionally, the coolant supply device is placed, such that the motor driving force is transmitted from the motor driveshaft to the coolant supply device directly or via the transmission mechanism. For the direct transmission of the motor driving force from the motor driveshaft, the rotary member of the coolant supply device may be directly attached to the motor driveshaft. The motor can thus be placed close to the coolant supply device. For the transmission of the motor driving force via the transmission mechanism, the coolant supply device may be placed in parallel with the gas supply device to be close to the motor across the transmission mechanism. In the system including the gas supply device, the coolant supply device and the common motor in addition to the gas consuming device or the fuel cell, placing these supply devices close to the motor enables size reduction of the system.

According to one embodiment of the fuel cell system, the driving force of the motor, which may be driven to enable the coolant supply device to have an operating condition required for circulation of the coolant, maybe transmitted to the coolant supply device, and the transmission mechanism for transmitting the motor driving force to the gas supply device may cause the gas supply device to have an operating condition required for supply of the oxidizing gas, through acceleration control of a rotation speed of the motor. This embodiment has the following advantageous effects. The acceleration control of the motor rotation speed is readily achieved by a speed control device incorporated in the system.

In the cooling system for cooling down the device by the circulation of the coolant, it is generally not required to significantly change the flow rate of the coolant circulation, although the flow rate of the coolant circulation may be somewhat varied according to the state of heat generation by the fuel cell. The coolant supply device is thus only required to cause the rotary member involved in the coolant circulation to be in the operating condition required for the coolant circulation. The gas supply device, on the other hand, generally requires compression of the gas, since the supply object is in the gas form. The gas supply device is thus required to drive the rotary member involved in both the gas compression and the pressure-feed of the gas at a relatively high speed.

In the fuel cell system according to the embodiment, simply driving the motor in the operating condition required for the coolant circulation enables the coolant supply device to have the operating condition required for the coolant circulation, while enabling the gas supply device to have the operating condition required for the oxidizing gas supply through the acceleration control. This does not require the high-speed operation of the motor for driving the gas supply device at a relatively high rotation speed and thereby does not require the high-capacity motor. This leads to reduction of the required capacity and size for the motor and further size reduction of the fuel cell system. The coolant supply device is only required to be driven in the operating condition sufficient for circulation of the coolant. This readily achieves the sealing property required for the coolant circulation path as well as the coolant supply device, thus ensuring the high reliability of sealing.

According to another embodiment, the fuel cell system may further include a casing with legs, wherein the motor and the gas supply device arranged to be opposed to each other across the transmission mechanism may be placed, along with the coolant supply device, in the casing, and the casing may be fastened to the fuel cell via the legs. This enables the heat generated by the fuel cell to be transmitted to the casing via the legs, which is advantageous for cooling down the fuel cell. The unitization of the components in the casing facilitates handling of the fuel cell system.

According to still another embodiment of the fuel cell system, an inner-casing flow path for the coolant may be formed in a motor surrounding wall of the casing surrounding the motor and arranged to pass through the coolant supply device. The motor can thus be externally cooled down by the flow of the coolant. This enhances the effectiveness to maintain the power of the motor and allows for simplification or even omission of the specific structure of the motor for ensuring the heat dissipation area, thus enabling size reduction of the motor.

According to another embodiment of the fuel cell system, the inner-casing flow path may have a plugged coolant outlet, which is located on an upper side of the casing in a state that the casing is installed at an installation position. Expelling the air bubbles entering the flow path in the cooling system through the coolant outlet and subsequently plugging the coolant outlet ensures the supply and circulation of the coolant with substantially no air bubbles. This reduces the potential pressure loss due to the remaining air bubbles during supply and circulation of the coolant and ensures the stable supply of the coolant. For example, the coolant should be replaced, when the ion dissolution into the coolant increases the ion conductivity of the coolant. The air bubbles entering the flow path during replacement of the coolant can readily be expelled in the above manner.

One aspect of a vehicle, on which the fuel cell system according to any of the above embodiments is mounted, wherein the motor driveshaft of the motor, a rotating shaft of the coolant supply device and a rotating shaft of the gas supply device are arranged across a vehicle width direction to be parallel to one another, and the fuel cell, the motor, the coolant supply device and the gas supply device are placed in a hood lower region below a hood of the vehicle.

The size reduction of the system and its respective components and the unitization of some components in the casing as described above facilitate installation of the fuel cell system on the vehicle. Such size reduction and unitization lead to saving the space in the hood lower region, thus ensuring the wider space available for a controller and other auxiliary devices for the fuel cell and enhancing the degree of freedom in installation.

According to one embodiment, the fuel cell system may be mounted on the vehicle, such that an outer shell of the motor may be located in a vehicle forward portion in the hood lower region. In the case of a collision of the vehicle at the front, the high-rigid motor receives the impact load, thus protecting the other parts from potential damages.

The present invention may be implemented by diversity of aspects and embodiments, for example, a power generation facility including the fuel cell system and a system including a gas consuming device other than the fuel cell.

BRIEF DESCRIPTION OF THE DRAWINGS

FIG. 4 is a top view schematically illustrating the process of mounting the cell auxiliary unit 200 on the fuel cell vehicle 10;

FIG. 11 corresponding to FIG. 4 is a top view schematically illustrating the process of mounting the cell auxiliary unit 200A on the vehicle.

DESCRIPTION OF THE EMBODIMENT

Figure 1:
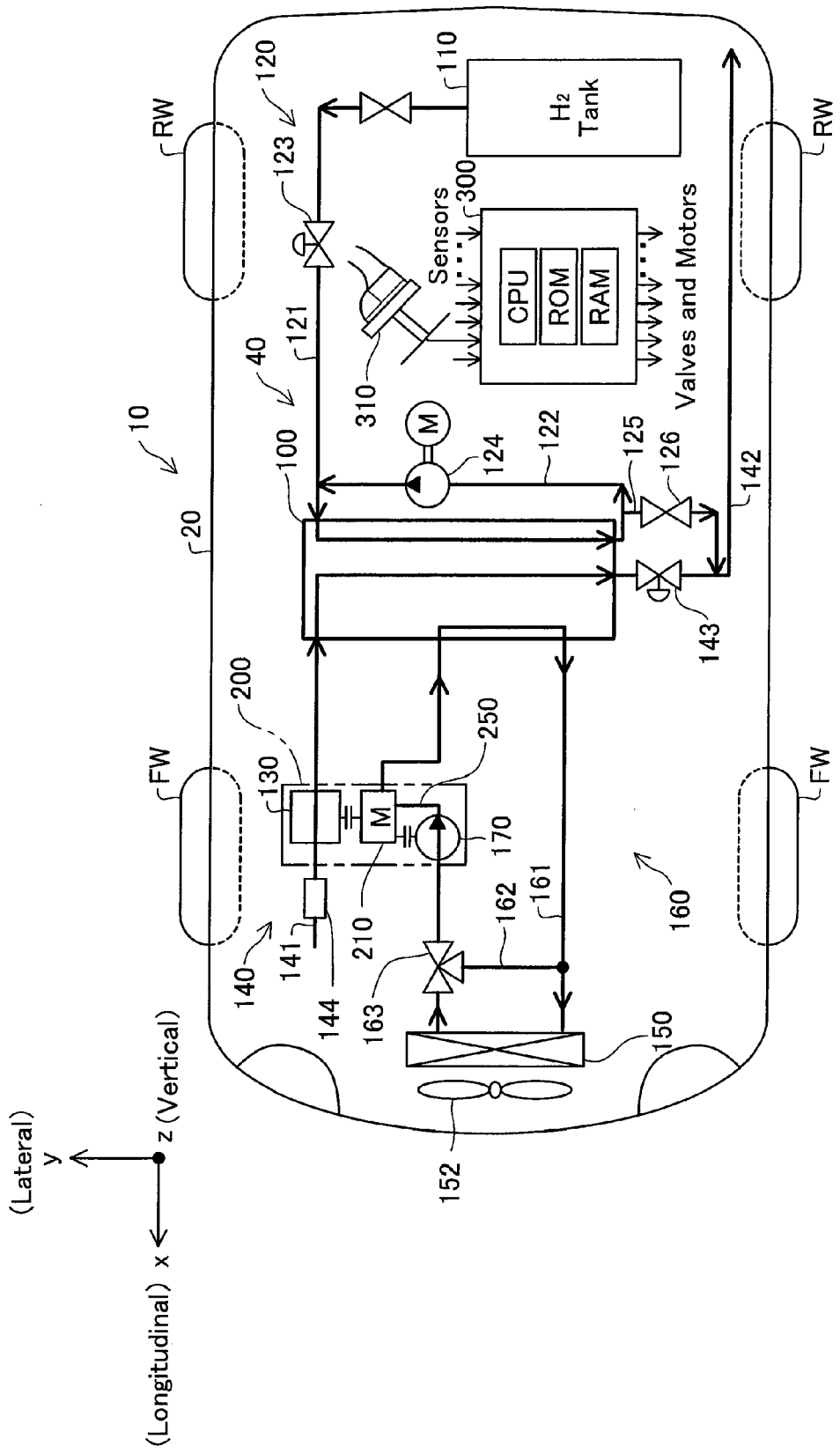
FIG. 1 is a plan view schematically illustrating a fuel cell vehicle 10 according to one embodiment of the invention.

Aspects of the present invention are described in detail with reference to embodiments. FIG. 1 is a plan view schematically illustrating a fuel cell vehicle 10 according to one embodiment of the invention.

As illustrated, the fuel cell vehicle 10 has a fuel cell system 40 mounted on a vehicle body 20. The fuel cell system 40 has a fuel cell 100, a hydrogen gas supply system 120 including a hydrogen gas tank 110, an air supply system 140 including a compressor 130, and a cooling system 160 including a radiator 150 and a 'fan 152. The fuel cell 100 is constructed by stacking power generation modules including membrane electrode assemblies (MEAs) (not shown), each of which is obtained by joining two electrodes, i.e., anode and cathode, to both faces of an electrolyte membrane, and is located in a hood lower region of the vehicle body 20. The installation positions of the fuel cell and the relevant components including the compressor 130 will be described later. The fuel cell 100 receives supplies of hydrogen gas and the air from the hydrogen gas supply system 120 and the air supply system 140 described below, consumes the supplied gases or more specifically hydrogen and oxygen contained in these gases for electrochemical reactions to generate electric power, and drives a load, such as drive motors for front and rear wheels (not shown), with the generated electric power.

The hydrogen gas supply system 120 includes a hydrogen supply path 121 leading from the hydrogen gas tank 110 to the fuel cell 100, and a circulation path 122 for circulating the unused hydrogen gas (anode off gas) to the hydrogen supply path 121. This hydrogen gas supply system 120 supplies a total flow of hydrogen gas, as the sum of the flow rate regulated by a flow regulator 123 on the hydrogen supply path 121 and the circulation flow rate regulated by a circulation pump 124 on the circulation path 122, to the anodes of the fuel cell 100. The supply rate of the hydrogen gas is determined according to the operation of an accelerator 310 by a controller 300 described later to be dependent on the load required for the fuel cell 100. The hydrogen gas supply system 120 occasionally releases the anode off gas to the atmosphere via the switching control of an on-off valve 126 on an exhaust conduit 125 branched off from the circulation path 122.

The air supply system 140 includes an oxygen supply path 141 leading through the compressor 130 to the fuel cell 100, and a release path 142 for releasing the unused air (cathode off gas) to the atmosphere. The air supply system 140 removes the dust from the air, which is taken in through an open end of the oxygen supply path 141, by an air cleaner 144 and supplies the cleaned intake air to the cathodes of the fuel cell 100 via compression and flow regulation of the air by the compressor 130. The air supply system 140 releases the cathode off gas through the release path 142 to the atmosphere at the flow rate regulated by an emission flow regulator 143 on the release path 142. The air supply system 140 involved in both the supply of the air and the emission of the cathode off gas adjusts the emission flow regulator 143 to a preset opening and supplies the air via the compressor 130. Like the hydrogen gas, the supply rate of the air is determined according to the operation of the accelerator 310 by the controller 300 to be dependent on the load required for the fuel cell 100. The air supply system 140 performs the air supply at the increased supply rate (pressure feed) corresponding to the load and the opening control of the emission flow regulator 143 to or over a preset opening, so as to discharge the water remaining on the cathode through the release path 142 and thereby reduce the remaining amount of water on the electrode. The reduction of the remaining amount of water by the increased air supply is not directly related to the present invention and is not described in detail.

The cooling system 160 includes a circulation path 161 for circulating a coolant from the radiator 150 to the fuel cell 100, a bypass path 162, a three-way flow regulator 163 at the junction of the paths, and a circulation pump 170. This cooling system 160 leads the coolant, which is subjected to heat exchange by the radiator 150, through the circulation path 161 to an inner-cell circulation path (not shown) inside the fuel cell 100 to cool down the fuel cell 100 to a preset temperature level. The actuation of the circulation pump 170, i.e., the circulated supply of the coolant, and the radiator bypass flow rate by the three-way flow regulator 163 are determined by the controller 300, based on the fuel cell temperature measured by a temperature sensor (not shown) and the power generation status detected by a sensor (not shown).

The compressor 130 included in the air supply system 140 and the circulation pump 170 included in the cooling system 160 are both motor-driven types and are incorporated in a cell auxiliary unit 200. This cell auxiliary unit 200 includes a motor 210 as the common driving source of the compressor 130 and the circulation pump 170, and a coolant inner-unit flow path 250 passing through the circulation pump 170 to lead the flow of the coolant through the inner-unit flow path 250 to the circulation path 161. The structure of the cell auxiliary unit 200 will be described later.

The controller 300 is implemented by a microcomputer including a CPU performing logical operations, a ROM and a RAM and controls the various operations of the fuel cell vehicle 10. For example, the controller 300 determines the supply rates of the hydrogen and the air to the fuel cell 100 in response to the inputs of the accelerator 310 and various sensors and drives and controls the flow regulator 123 and the compressor 130 to ensure the hydrogen supply and the air supply at the determined supply rates.

Figure 2:
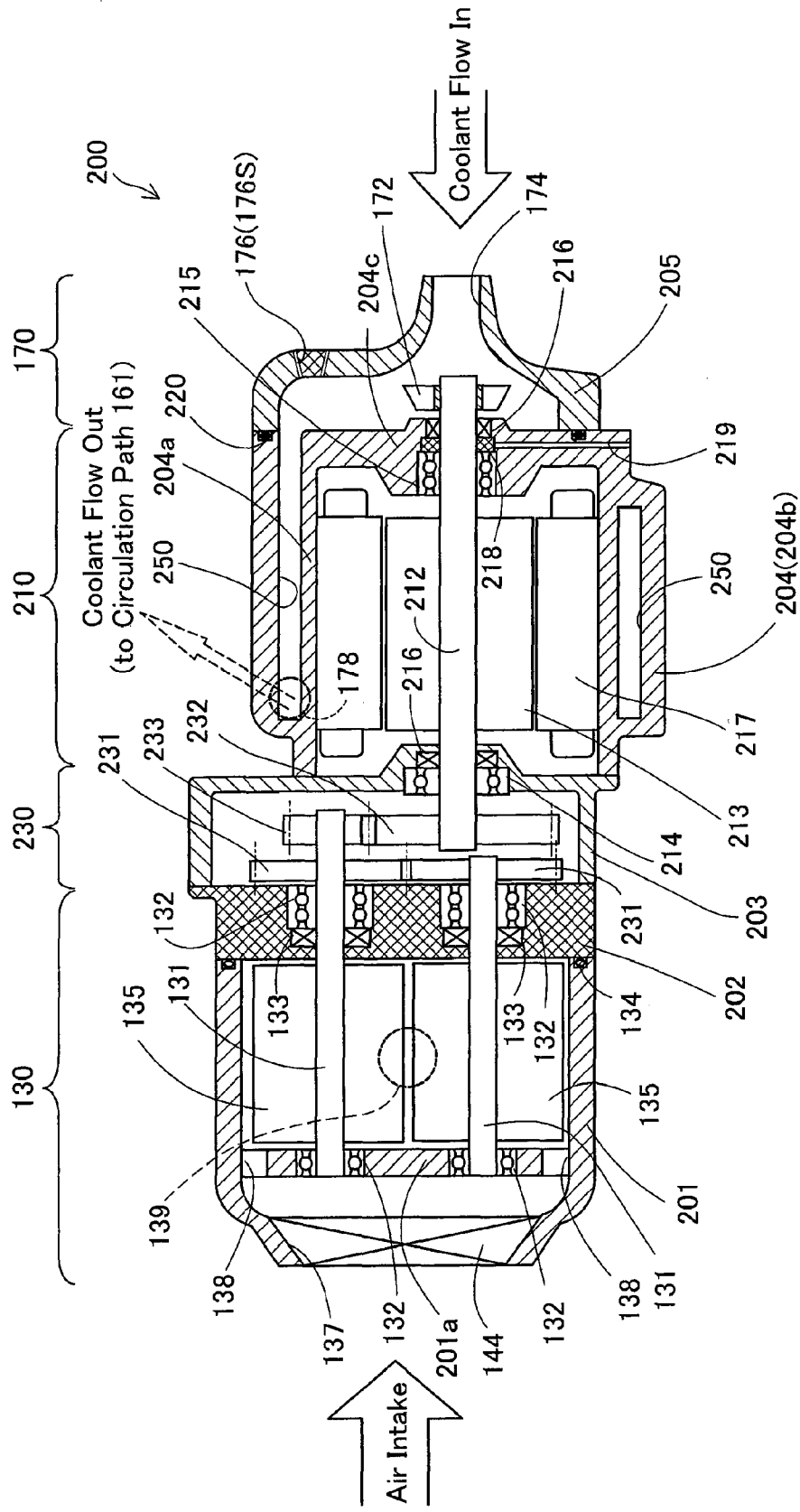
FIG. 2 is a sectional view schematically illustrating the internal structure of a cell auxiliary unit 200.

The cell auxiliary unit 200 is described below. FIG. 2 is a sectional view schematically illustrating the internal structure of the cell auxiliary unit 200.

As described above, the cell auxiliary unit 200 includes a motor driving force transmission mechanism 230, in addition to the compressor 130, the circulation pump 170 and the motor 210 as the common driving source of the compressor 130 and the circulation pump 170, which are all accommodated in a unit casing as illustrated in FIG. 2. The unit casing of the cell auxiliary unit 200 is parted into a first casing 201, a casing base 202, a second casing 203, a third casing 204, and a fourth casing 205, which are provided sequentially from the left to the right (in the drawing) corresponding to the respective parts of the cell auxiliary unit 200. These casings form the outer shells of these parts.

The first casing 201 is hollow and is joined with the casing base 202 to accommodate the compressor 130. As illustrated, the compressor 130 has the route-type or screw-type biaxial synchronous driving system with two rotating shafts 131 provided in parallel, wherein the respective ends of each rotating shaft 131 are supported by an inner support wall 201a of the first casing 201 and by a bearing 132 built in the casing base 202. The casing base 202 has the built-in bearings 132 provided via first sealing members 133. The first sealing members 133 and second sealing members 134 serve to seal the casing base side of the first casing 201, more specifically, the openings and the bearing sites. The hollow space located between the inner support wall 201a of the first casing 201 and the casing base 202 serves as an air compression chamber. Through holes 138 are formed at equal pitches in the inner support wall 201a for the air inflow into the air compression chamber.

The compressor 130 receives the transmitted motor driving force as described later and rotates the respective rotating shafts 131 along with rotary members 135. During the rotation of the rotary members 135, the compressor 130 introduces the air through an air inlet 137 of the first casing 201 via the air cleaner 144 and compresses the introduced air. The compressed air is pressure-fed through a vent 139 formed in the side face of the first casing 201 and is supplied through the oxygen supply path 141 (FIG. 1) to the cathodes of the fuel cell 100.

The second casing 203 is hollow and is joined with the casing base 202 on the side opposite to the first casing 201 to accommodate the transmission mechanism 230. The transmission mechanism 230 includes synchronizing gears 231, a motor drive gear 232 and a driven gear 233 as gears for transmitting the motor driving force of the motor 210 to the compressor 130. The synchronizing gears 231 are attached to the respective rotating shafts 131 of the compressor 130, which run through the casing base 202 and are extended to the second casing 203. The synchronizing gears 231 of the respective rotating shafts 131 have the same number of teeth and engage with each other in the second casing 203 as illustrated. The motor drive gear 232 is attached to a motor driveshaft 212 (described later) extended to the second casing 203 and engages with the driven gear 233 attached to the axial end of the upper (in the drawing) rotating shaft 131 in the second casing 203.

The transmission mechanism 230 of such gear structure enables the rotation of the motor driveshaft 212 to be transmitted to the rotating shaft 131 with the driven gear 233 through engagement of the motor drive gear 232 and the driven gear 233. The transmission of the rotation depends on the ratio of the length of the gear teeth of the driven gear 233 to the length of the gear teeth of the motor drive gear 232. The rotation of the motor driveshaft 212 is subjected to acceleration control and is transmitted to the rotating shaft 131. The rotation of one rotating shaft 131 is transmitted synchronously at the same rotation speed to the other rotating shaft 131 through the engagement of the synchronizing gears 231. The rotation of the rotating shaft 131 is equivalent to the rotation of the compressor 130. According to this embodiment, the gear ratio of the driven gear 233 to the motor drive gear 232 is determined by taking into account the rotation speed of the motor driveshaft 212, so as to achieve the operating condition of the compressor 130 required for the air supply to the fuel cell 100, for example, the operating condition at the rotation speed up to about 20,000 rpm as described later in detail.

The third casing 204 includes a hollow inner casing 204a with an open end on one side adjacent to the second casing 203 and a closed end on the other side, and a casing outer wall 204b surrounding the inner casing 204a. The casing outer wall 204b forms the outer shell of the motor 210. The third casing 204 has the inner-unit flow path 250 (FIG. 1) formed between the inner casing 204a and the casing outer wall 204b and is joined with the second casing 203 to accommodate the motor 210 in the inner casing 204a. The respective ends of the motor driveshaft 212 with a rotor 213 in the motor 210 are supported by means of a bearing 214 incorporated in the second casing 203 and a bearing 215 incorporated in a closed wall 204c of the third casing 204. The motor driveshaft 212 has one end extended to the second casing 203 as explained above and the other end extended to the fourth casing 205.

The second casing 203 and the third casing 204 have motor sealing members 216 at their respective bearing sites, which seal the hollow space of the third casing 204, i.e., the rotating area of the rotor 213 and an induction coil 217 attached to the inner wall of the third casing 204. The third casing 204 has a water-retaining circular body 218 provided between the bearing 215 and the motor sealing member 216 at the closed wall 204c, and a small-diameter drain hole 219 formed to run from the circular body site to the casing outer wall. The circulation pump 170 is located on the motor sealing member 216-side of the closed wall 204c. Even when water passes through the motor sealing member 216, the water is retained by the circular body 218 and is drained out of the third casing 204 via the drain hole 219. In order to accelerate such water drainage by the water's own weight, the drain hole 219 is formed to face vertically downward in the attitude of the cell auxiliary unit 200 mounted on the vehicle as described later.

The fourth casing 205 is hollow and is joined with the casing outer wall 204b and the closed wall 204c of the third casing 204 to accommodate the circulation pump 170. Third sealing members 220 are used for joining the fourth casing 205, so that the inside of the fourth casing 205 communicates with the inner-unit flow path 205 of the third casing 204 and is sealed against the inner casing 204a for accommodating the motor 210. The circulation pump 170 includes, as the primary component, a rotary vane 172 with a number of vanes to rotate for the pressure feed of the coolant, which is attached and fastened to the motor driveshaft 212 extended to the fourth casing 205. Since the rotary vane 172 is directly attached to the motor driveshaft 212 of the motor 210, the circulation pump 170 rotates its rotary vane 172 at the same rotation speed as that of the motor 210 to pressure-feed the coolant by means of the rotating vanes. In other words, the circulation pump 170 utilizes the rotation of this rotary vane 172 to pressure-feed the coolant flowed in through a coolant inlet 174 to the inner-unit flow path 250. The pressure-fed coolant runs through the inner-unit flow path 250 of the third casing 204 forming the outer shell of the motor 210 and flows through a coolant hole 178, which is formed in the casing outer wall 204b of the third casing 204, on the bottom side of the inner-unit flow path 250 to reach the fuel cell 100 via the circulation path 161 (FIG. 1) and is circulated through the circulation path 161. The fourth casing 205 has a coolant outlet 176 with a tapered, female-threaded inner wall. The coolant outlet 176 is ordinarily closed by a corresponding tapered, male-threaded plug 176S screwed to the tapered, female-threaded inner wall, and is opened, for example, for exchange of the coolant. The position of forming the coolant outlet 176 will be described later.

The first to the fourth casings and the casing base 202 are all aluminum die-cast parts and are integrated by means of bolts via the respective sealing members. The cell auxiliary unit 200 may thus be mounted on the vehicle and detached from the vehicle for inspection, while the compressor 130 and the other relevant parts are kept in the respective casings.

In the cell auxiliary unit 200 with the compressor 130, the motor 210 and the other relevant parts incorporated in the first to the fourth casings and the casing base 202, the motor driveshaft 212 is located to face the rotating shafts 131 of the compressor 130, so that the motor 210 and the compressor 130 are arranged to be opposed to each other across the transmission mechanism 230. In the cell auxiliary unit 200, the motor driveshaft 212 also serves as the rotating shaft of the rotary vane 172 of the circulation pump 170, so that the motor driving force is directly transmitted from the motor driveshaft 212 to the circulation pump 170. The circulation pump 170 is accordingly placed adjacent to the circulation pump 170. Such arrangement is implemented by joining the respective casings as described above.

Figure 3:
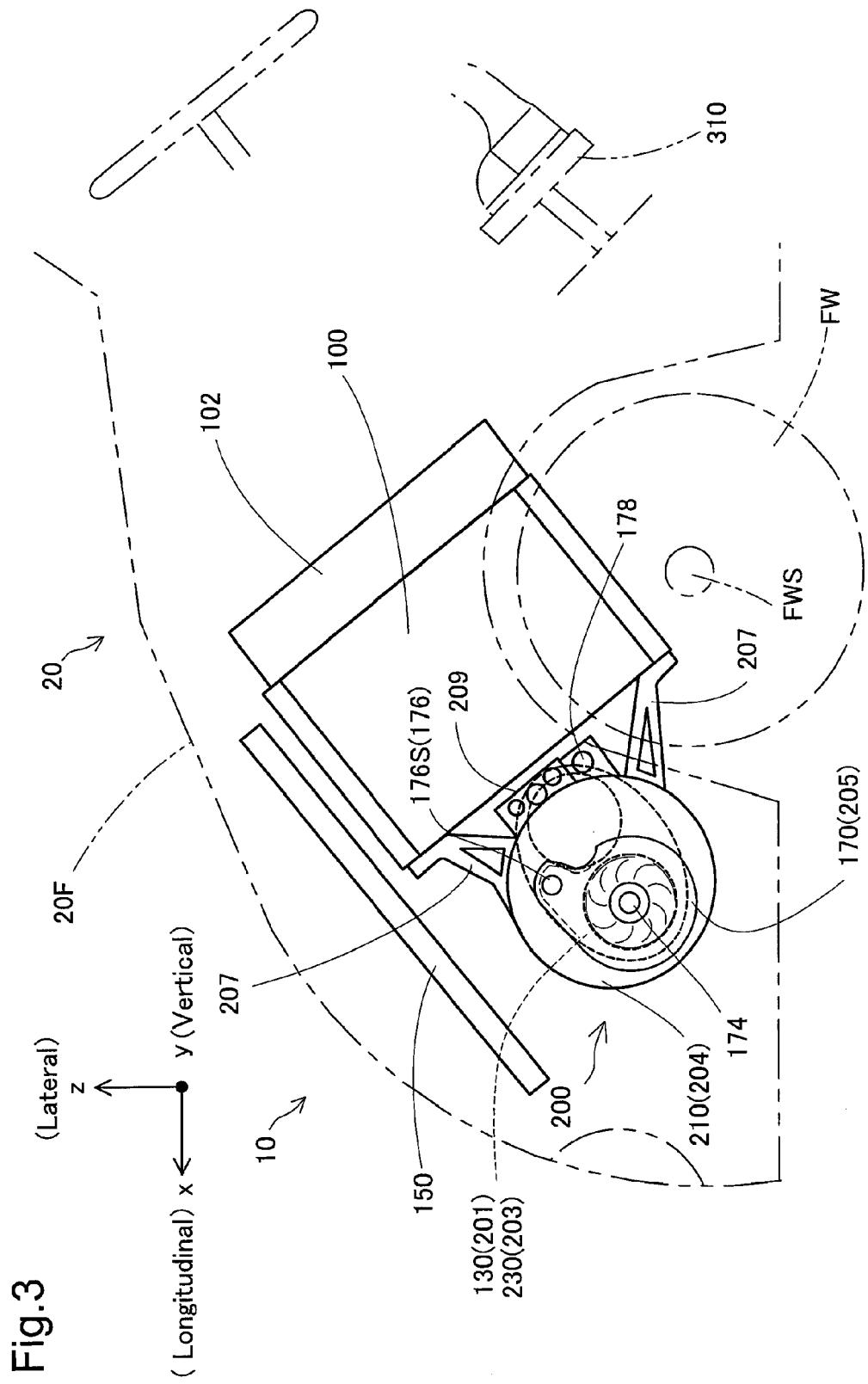
FIG. 3 is a side view schematically illustrating the process of mounting the cell auxiliary unit 200 on the fuel cell vehicle 10.

The process of mounting the cell auxiliary unit 200 on the vehicle is described below. FIG. 3 is a side view schematically illustrating the process of mounting the cell auxiliary unit 200 on the fuel cell vehicle 10. FIG. 4 is a top view schematically illustrating the process of mounting the cell auxiliary unit 200 on the fuel cell vehicle 10.

Since the cell auxiliary unit 200 has the components involved in the supply of oxygen to the fuel cell 100 and the supply and circulation of the coolant, it is preferable to place the cell auxiliary unit 200 close to the fuel cell 100 for the simplified layout of the supply paths and the shortened paths. According to this embodiment, the cell auxiliary unit 200 is directly fastened to the fuel cell 100 as shown in FIG. 3. Bifurcated fixation legs 207 extended from the casing of the cell auxiliary unit 200 are used for fixation of the cell auxiliary unit 200. As illustrated in FIG. 4, the legs 207 are extended respectively from the third casing 204 for the motor 210 and from the first casing 201 for the compressor 130 and are fastened to a fixation member of the fuel cell 100, for example, an end plate, with bolts (not shown).

The fuel cell 100 and the cell auxiliary unit 200 are placed in a lower region below a hood 20F at the front of the vehicle body 20 as shown in FIG. 3. The fuel cell 100 assembled with the cell auxiliary unit 200 is mounted on and fixed to a cross frame (not shown) spanned between side frames (not shown) provided on the left and right in the vehicle width direction and extended in the longitudinal direction of the vehicle. According to this embodiment, the fuel cell 100 and the cell auxiliary unit 200 are installed in the vehicle forward portion to be placed between left and right front wheels FW and not to interfere with a front wheel driveshaft FWS.

For the efficient use of the lower region below the hood 20F, the fuel cell 100 is placed in an inclined manner, whilst the cell auxiliary unit 200 is placed on the more forward side in the vehicle than the fuel cell 100. A base part 102, such as a converter, to be protected from potential damages, is attached to the other side of the fuel cell 100, i.e., opposite to the cell auxiliary unit 200. In such installation attitude, the cell auxiliary unit 200 is inclined and supported by the fixation legs 207, such that the coolant outlet 176 is located on the upper side of the unit casing, specifically on the upper side of the fourth casing 205 in the vertical direction of the vehicle shown in FIG. 3. The cell auxiliary unit 200 has part of the casing outer wall 204b with the coolant hole 178 extended between the fixation legs 207, and further includes a cable seat 209, to which a power supply cable of the motor 210 is connected. When the cell auxiliary unit 200 is fixed in the attitude of FIG. 3, the coolant hole 178 and the cable seat 209 are hidden by the casing of the cell auxiliary unit 200, specifically by the third casing 204 forming the outer shell of the motor 210, seen from the front side of the vehicle.

According to this embodiment, the fuel cell 100 assembled with the cell auxiliary unit 200 is placed adjacent to a transmission TM in the lower region below the hood 20F as shown in FIG. 4. The motor driveshaft 212 of the motor 210 also serving as the rotating shaft of the circulation pump 170 is arranged adjacent to the rotating shafts 131 of the compressor 130 along the vehicle width direction.

The fuel cell vehicle 10 according to the embodiment structured as described above has the following advantageous effects.

In the fuel cell vehicle 10 according to the embodiment, the fuel cell system including the fuel cell 100, the air supply system 140 and the cooling system 160 is mounted on the vehicle body 20, such that the compressor 130 included in the air supply system 140, the circulation pump 170 included in the cooling system 160, the motor 210 as the common driving source of the compressor 130 and the circulation pump 170, and the transmission mechanism 230 for transmitting the motor driving force to the compressor 130 are accommodated in the first casing 201 and the other casings and are integrated as the cell auxiliary unit 200 (FIG. 2). This facilitates attachment to the vehicle body 20 and detachment from the vehicle body 20 for the purpose of, for example, maintenance and inspection or replacement.

The compressor 130, the circulation pump 170, the common motor 210 and the transmission mechanism 230 are accommodated in the respective casings and are integrated as the cell auxiliary unit 200, such that the motor 210 is opposed to the compressor 130 across the transmission mechanism 230, wherein the compressor 130 is located at one end of the motor 210 and the motor driveshaft 212 is provided to face the rotating shafts 131 of the compressor 130 (FIG. 2). Such opposed arrangement of the compressor 130 and the motor 210 enables the motor 210 and the compressor 130 to be relatively close to each other across only a narrow distance required for the transmission mechanism 230.

In addition to this opposed arrangement, in the cell auxiliary unit 200 according to the embodiment, the circulation pump 170 is located at the other end of the motor 210, and the rotary vane 172 of the circulation pump 170 is directly attached to the motor driveshaft 212, so that the motor driving force is directly transmitted from the motor driveshaft 212 to the circulation pump 170. The circulation pump 170 is thus located close to the motor 210 as clearly shown in FIG. 2. In the fuel cell vehicle 10 according to this embodiment, the compressor 130, the circulation pump 170 and the motor 210 essential for the fuel cell 100 are arranged in the integrated manner and are unitized to the cell auxiliary unit 200, which leads to the size reduction of the system. The unitization to the cell auxiliary unit 200 facilitates installation of the fuel cell 100 and the cell auxiliary unit 200 on the fuel cell vehicle 10 of the embodiment, while reducing the space occupied for such installation in the lower region below the hood 20F. This ensures the wider space available for installation of the controller and the base part 102 for the fuel cell 100, such as the converter, thus enhancing the degree of freedom in installation.

The cell auxiliary unit 200 including the compressor 130 and the other relevant parts in the integrated manner as described above is fastened to the fuel cell 100 by means of the fixation legs 207 (FIG. 3). The heat generated during the operation of the fuel cell 100 can thus be transmitted to the first casing 201 and the other casings of the cell auxiliary unit 200 via the fixation legs 207, so that the fuel cell 100 is preferably cooled down by such heat release. According to this embodiment, the first casing 201 to the fourth casing 205 and the casing base 202 are the aluminum die-cast parts. This improves the heat-release cooling efficiency of the fuel cell 100 via the fixation legs 207, which is beneficial for maintaining the operation of the fuel cell 100.

In the fuel cell vehicle 10 according to the embodiment, the compressor 130 and the circulation pump 170 accommodated in and integrated to the cell auxiliary unit 200 are driven by the motor 210. The rotary vane 172 of the circulation pump 170 is driven directly by the rotation of the motor driveshaft 212 of the motor 210, whilst the rotating shafts 131 of the compressor 130 are driven via the transmission mechanism 230. The rotating shafts 131 of the compressor 130 are driven through acceleration control of the rotation of the motor 210 at the rotation speed depending on the gear ratio of the driven gear 233 to the motor drive gear 232 of the transmission mechanism 230. This has the following advantageous effects.

Water is generated at the cathodes of the fuel cell 100, as the electrochemical reaction proceeds. The compressed air is supplied to the cathodes at a higher flow rate than the flow rate of the air required for power generation, in order to accelerate drainage of the generated water out of the fuel cell 100. The compressor 130 of the route-type or screw-type biaxial synchronous driving system adopted in this embodiment is required to be driven at the rotation speed up to about 20,000 rpm for the supply of the compressed air at the high flow rate. The circulation pump 170 is, on the other hand, used to maintain the circulation of the coolant through the circulation path 161 including the fuel cell 100, so that the supply of the coolant at a high flow rate is not required for the circulation pump 170.

According to this embodiment, by taking into account such different operating conditions (rotating conditions) required for the compressor 130 and the circulation pump 170, the transmission of the motor driving force to the compressor 130 via the transmission mechanism 230, and the direct transmission of the motor driving force to the circulation pump 170, the operation of the motor 210 is determined to drive the circulation pump 170 in the operating condition required for circulation of the coolant, e.g., at the rotation speed up to about 8,000 rpm. Setting the gear ratio of the motor drive gear 232 and the driven gear 233 to allow for acceleration control enables the compressor 130 to be driven at the rotation speedup to 20,000 rpm. In other words, simply driving the motor 210 to achieve the operating condition of the circulation pump 170 required for circulation of the coolant also enables the compressor 130 to be driven in the operating condition required for supply of the compressed air at a high flow rate through the acceleration control. This does not require the high-speed operation of the motor 210 for driving the compressor 130 at the relatively high rotation speed and thereby does not require the high-capacity motor. This leads to reduction of the required capacity and size for the motor 210 and further size reduction of the cell auxiliary unit 200. The circulation pump 170 is only required to be driven in the operating condition sufficient for circulation of the coolant. This readily achieves the sealing property required for fixation of the fourth casing 205 forming the outer shell of the circulation pump 170 and the sealing property required for the inner-unit flow path 250 and the circulation path 161, thus ensuring the high reliability of sealing.

The compressor 130 and the other relevant parts are integrated in and unitized to the cell auxiliary unit 200 as described above. The third casing 204 forming the outer shell of the motor 210 includes the inner casing 204a and the casing outer wall 204b surrounding the inner casing 204a, wherein the inner-unit flow path 250 for the flow of the coolant from the circulation pump 170 is formed between the inner casing 204a and the casing outer wall 204b. The motor 210 can thus be externally cooled by the coolant flowing through the inner-unit flow path 250. This enhances the effectiveness to maintain the power of the motor 210 and allows for simplification or even omission of the specific structure for ensuring the heat dissipation area of the third casing 204 forming the motor outer shell, thus enabling size reduction of the motor and the cell auxiliary unit 200.

In the cell auxiliary unit 200 wherein the compressor 130 and the other relevant parts are integrated and unitized, the coolant outlet 176 is formed in the inner-unit flow path 250 and is ordinarily closed by the plug 176S. As shown in FIG. 3, the coolant outlet 176 is located on the upper side of the fourth casing 205 in the vehicle vertical direction, in the installation attitude where the fuel cell 100, the cell auxiliary unit 200 on one side of the fuel cell 100, and the base part 102 on the other side of the fuel cell 100 are installed in the inclined arrangement in the lower region below the hood 20F (hereinafter called inclined installation attitude). Even when air bubbles enter the circulation path 161 or the inner-unit flow path 250 during supply or replacement of the coolant, the air bubbles can be readily expelled through the coolant outlet 176 located on the upper side of the casing, so that the coolant can be supplied and circulated in the state with substantially no air bubbles. This reduces the potential pressure loss due to the remaining air bubbles during supply and circulation of, the coolant by the circulation pump 170 and ensures the stable supply of the coolant.

According to the fuel cell vehicle 10 of the embodiment, in the third casing 204 for the motor 210 integrated in and unitized to the cell auxiliary unit 200, the circular body 218 is provided on the side adjacent to the circulation pump 170, and the drain hole 219 extended from the circular body position is made to face downward in the vertical direction in the cell auxiliary unit 200 in the inclined installation attitude. Even when water enters the circular body 218 from the side of the circulation pump 170 placed adjacent to the motor 210, the water is retained in the circular body 218 and is then readily drained by its own weight through the drain hole 219 to the outside of the third casing 204. This effectively protects the motor 210 from potential damage by water intrusion and the resulting failure.

Additionally, in the fuel cell vehicle 10 according to the embodiment wherein the fuel cell 100 and the cell auxiliary unit 200 are installed in the lower region below the hood 20F, the cell auxiliary unit 200 in the inclined installation attitude is placed on the more forward side than the fuel cell 100. This ensures a wider space for the other side of the fuel cell 100 opposite to the cell auxiliary unit 200, thus enabling the effective use of the lower region below the hood 20F and facilitating installation of the base part 102 that should be protected from potential damages.

In the fuel cell vehicle 10 according to the embodiment wherein the fuel cell 100 and the cell auxiliary unit 200 are installed in the lower region below the hood 20F, the third casing 204 forming the outer shell of the motor 210 is located in the forward portion of the vehicle (FIGS. 3 and 4). In the case of a collision of the fuel cell vehicle 10 at the front, the high-rigid motor 210 located in the forward portion of the vehicle receives the impact load, so as to protect various parts including the parts of the cell auxiliary unit 200 other than the motor, the fuel cell 100 and the base part 102 from potential damages.

In the fuel cell vehicle 10 according to the embodiment wherein the fuel cell 100 and the cell auxiliary unit 200 are installed in the lower region below the hood 20F, the coolant hole 178 and the cable seat 209 for connection of the power supply cable are provided between the fixation legs 207 used for fixation of the cell auxiliary unit 200. The coolant hole 178 and the cable seat 209 are hidden by the cell auxiliary unit 200, specifically by the third casing 204 forming the outer shell of the motor 210, seen from the front side of the vehicle. In the case of a collision of the fuel cell vehicle 10 at the front, in combination with the arrangement of the high-rigid motor 210 receiving the impact load, this arrangement protects the coolant hole 178 and the cable seat 209 from potential damages and thereby prevents or suppresses leakage of the coolant or failure of the cable connection.

Figure 5:
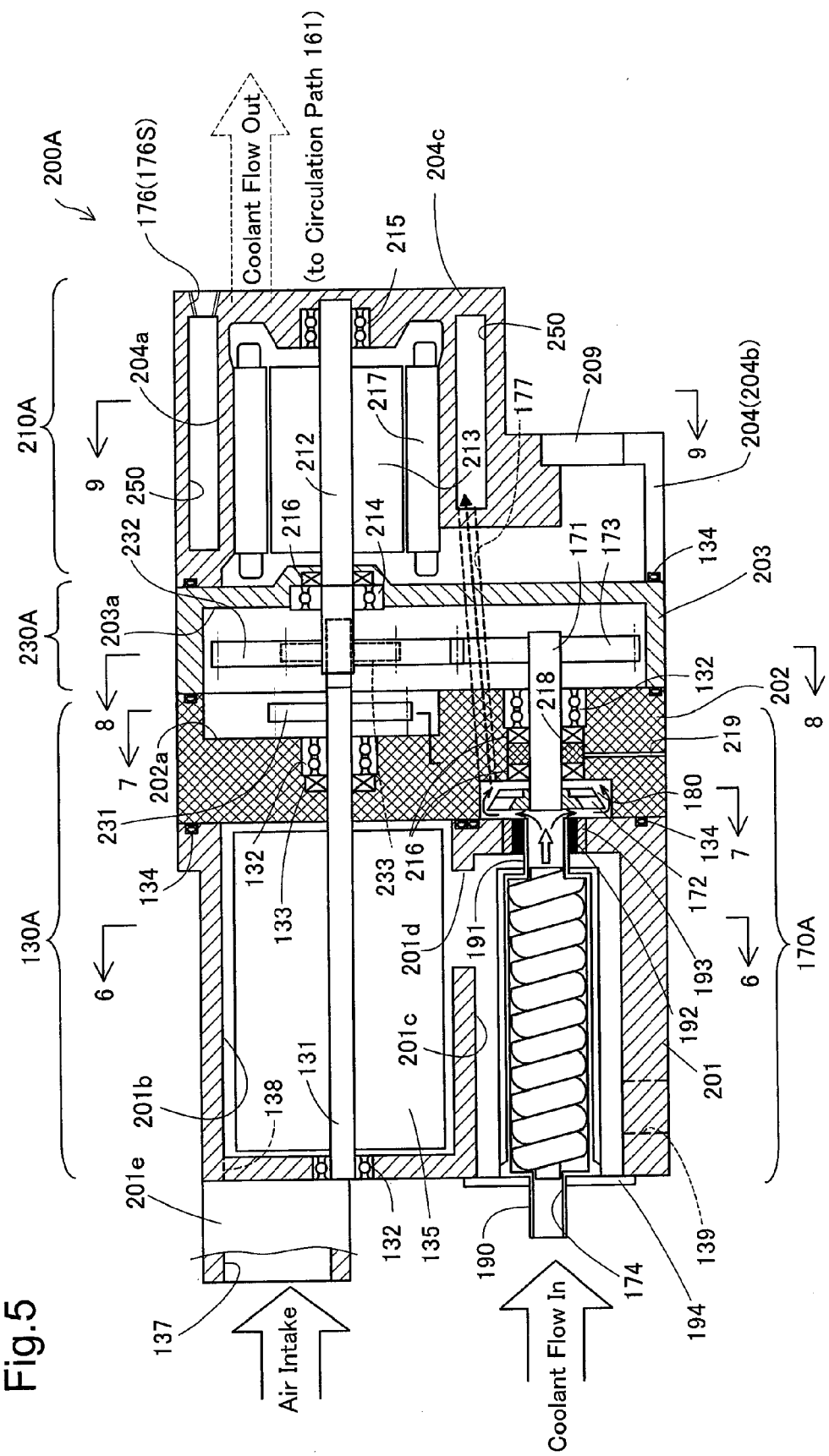
FIG. 5 is a sectional view schematically illustrating the internal structure of a cell auxiliary unit 200A according to a second embodiment.
Figure 6:
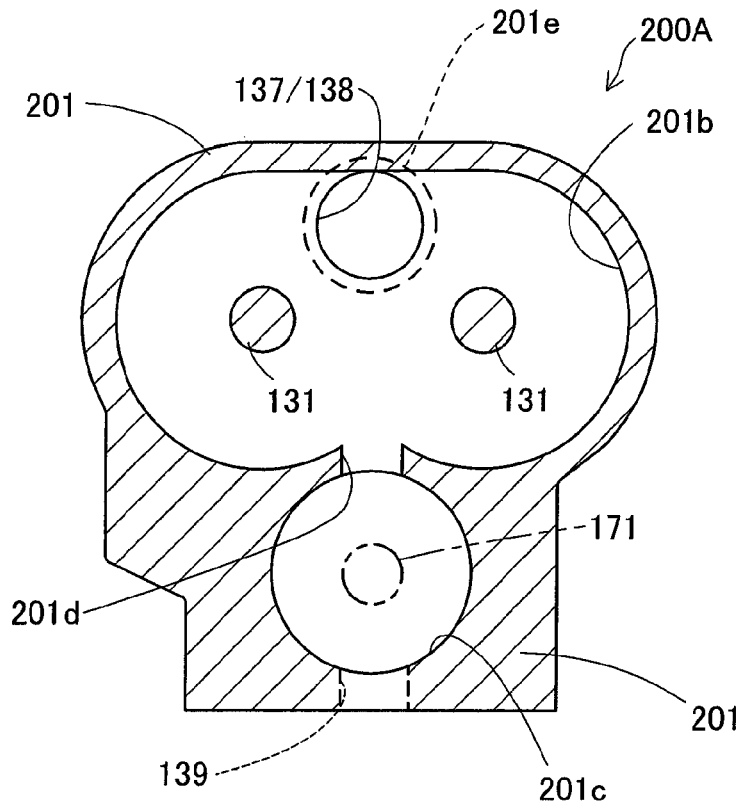
FIG. 6 is a sectional view taken on the line 6-6 of FIG. 5.
Figure 7:
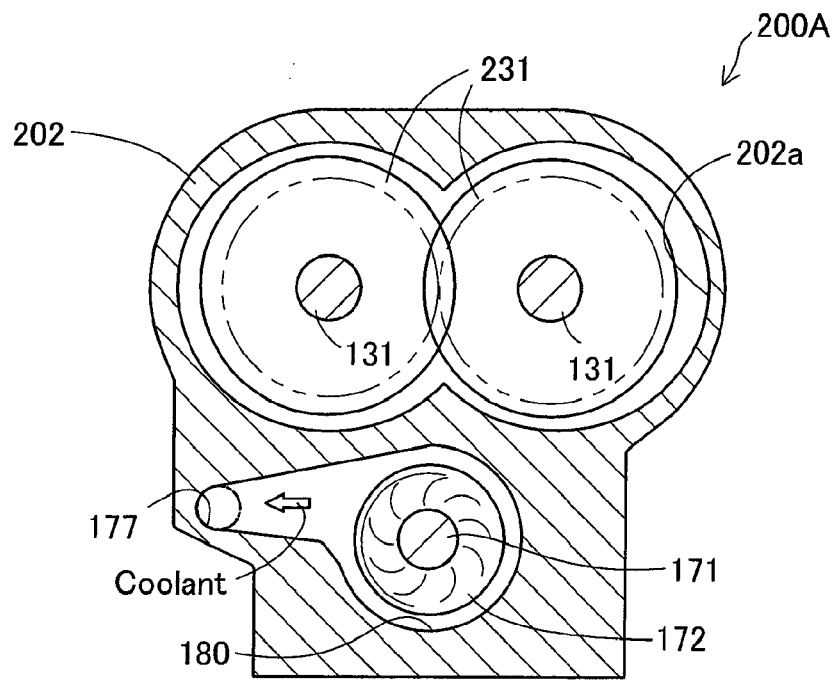
FIG. 7 is a sectional view taken on the line 7-7 of FIG. 5.
Figure 8:
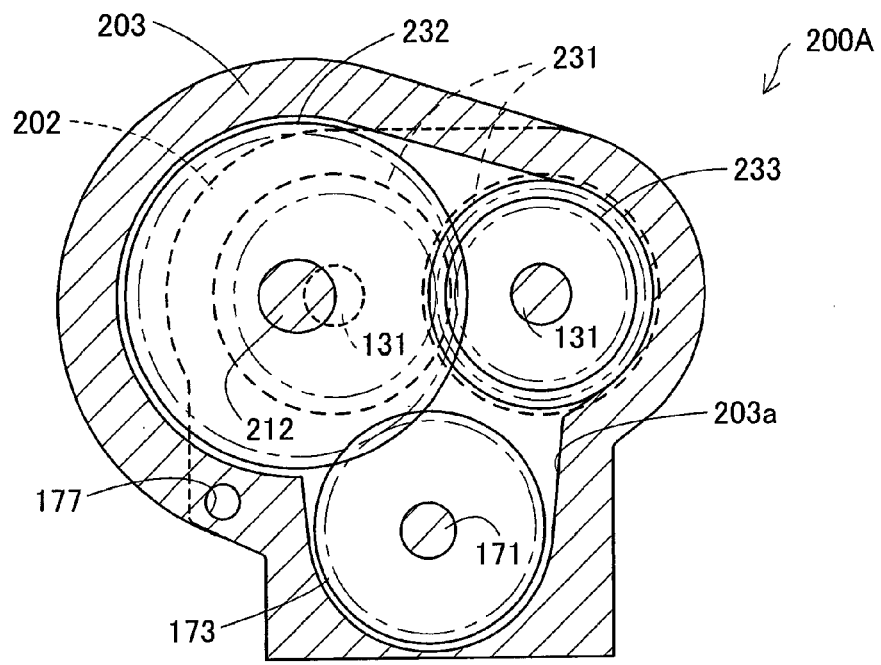
FIG. 8 is a sectional view taken on the line 8-8 of FIG. 5.
Figure 9:
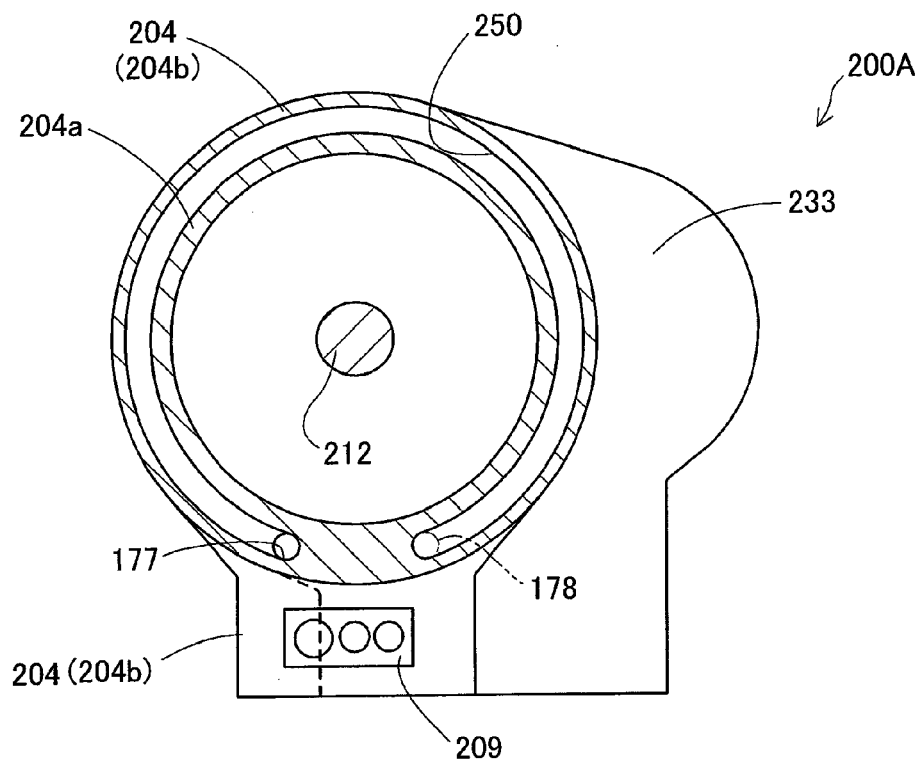
FIG. 9 is a sectional view taken on the line 9-9 of FIG. 5.

Another embodiment is described below. According to a second embodiment, while the compressor 130 and the motor 210 have the opposed arrangement in the cell auxiliary unit like the first embodiment, the circulation pump 170 and the compressor 130 are arranged adjacent to each other to transmit the motor driving force. FIG. 5 is a sectional view schematically illustrating the internal structure of a cell auxiliary unit 200A according to the second embodiment. FIG. 6 is a sectional view taken on the line 6-6 of FIG. 5. FIG. 7 is a sectional view taken on the line 7-7 of FIG. 5. FIG. 8 is a sectional view taken on the line 8-8 of FIG. 5. FIG. 9 is a sectional view taken on the line 9-9 of FIG. 5. In the description below, the parts having the same functions as those of the above cell auxiliary unit 200 are not specifically described here and are expressed by the same numerals and symbols used in the description of the cell auxiliary unit 200.

As shown in FIG. 5, like the cell auxiliary unit 200 described above, this cell auxiliary unit 200A includes compressors 130A, a circulation pump 170A, a motor 210A and a transmission mechanism 230A for transmitting the motor driving force are accommodated in the casing. The unit casing is divided into casings corresponding to the respective parts. According to the second embodiment, the compressors 130A and the circulation pump 170A are arranged adjacent to each other and are accommodating in a first casing 201 and a casing base 202, whilst the transmission mechanism 230A is accommodated in a second casing and the motor 210A is accommodated in a third casing 204. These casings form the outer shells of the respective parts.

As illustrated in FIGS. 6 to 8, the two compressors 130A of the route-type or screw-type biaxial synchronous driving system respectively have two rotating shafts 131 provided in parallel and supported at their ends. According to this embodiment, the circulation pump 170A and the compressors 130A are placed in parallel, such that the respective rotating shafts are arranged in parallel. For this arrangement, the first casing 201 includes a compressor chamber 201b and an intercooler chamber 201c as a flow path-forming member of the circulation pump 170A. These two chambers are connected with each other via a communication hole 201d, and a vent 139 is formed in the outer wall of the intercooler chamber 201c. The air taken in through an air inlet 137 (FIG. 5) is compressed by the compressors 130A in the compressor chamber 201b, flows through the communication hole 201d into the intercooler chamber 201c, further runs from the vent 139 through the oxygen supply path 141 (FIG. 1), and is supplied to the cathodes of the fuel cell 100. The compressed air passes through the communication hole 201d of the narrow passage area and enters the intercooler chamber 201c of the wider passage area than the communication hole 201d. This arrangement ensures supply of the compressed air to the oxygen supply path 141 with suppressing pulsation of the air flow. The vent 139 is placed away from the communication hole 201d along the longitudinal direction in the intercooler chamber 201c, thus effectively suppressing the pulsation of the air flow.

As shown in FIGS. 5 and 7, the casing base 202 has a pump chamber 180, which includes a rotary vane 172 of the circulation pump 170A and is arranged to communicate with the intercooler chamber 201c of the first casing 201. The casing base 202 also has a gear chamber 202a for accommodating synchronizing gears 231 on the opposite side. The compressors 130A are arranged adjacent to each other in the compressor chamber 201b and cause the identical synchronizing gears 231 to engage with each other in the gear chamber 202a. The circulation pump 170A has a pump rotating shaft 171 extended from the rotary vane 172 incorporated in the pump chamber 180 into a gear chamber 203a of the second casing 203. In the casing base 202, the pump rotating shaft 171 is supported by a bearing 132 and is sealed with two motor sealing members 216. The casing base 202 also has a circular body 218 and a drain hole 219 provided for water drainage as described above. In the casing base 202, the two rotating shafts 131 of the compressors 130A are supported by bearings 132 and are sealed with first sealing members 133. The first casing 201 and the casing base 202 are aluminum die-cast parts as mentioned above and are machined to have receiving holes for the bearings 132, the first sealing members 133 and the motor sealing members 216. The sufficient machining accuracy of the casing base 202 enables the rotating shafts 131 and the pump rotating shaft 171 to be supported and ensures the required accuracy in the assembly.

One of the adjacent compressors 130A accommodated in the compressor chamber 201b (i.e., the compressor 130A shown in FIG. 5) is located on the left in FIG. 7 and has the rotating shaft 131 extended to only the gear chamber 202a. The other compressor 130A, i.e., the right compressor 130A shown in FIG. 7, has the rotating shaft 131 extended to the gear chamber 203a of the second casing 203, in which a driven gear 233 is provided (FIGS. 5 and 8).

The circulation pump 170A has an intercooler part 190 accommodated in the intercooler chamber 201c of the first casing 201. The intercooler part 190 has a cylindrical edge 191 sealed with a hard rubber packing 192 placed in the first casing 201 and an outer retention ring 193, and a base held by the inner wall of the intercooler chamber 201c. The intercooler part 190 is fastened to an end face of the first casing 201 by means of a cover plate 194. The two-end support of the intercooler part 190 effectively absorbs vibration caused by the flow of the coolant. According to a preferred embodiment, the intercooler part 190 may have a small-diameter tapered edge to be fit in a tapered through hole formed in the packing 192, which enhances the sealing property. The coolant flowing into the intercooler part 190 passes through an inner-part flow path and the cylindrical edge 191 and enters the pump chamber 180 in the casing base 202. A coolant communication path 177 is extended from the pump chamber 180 to an inner-unit flow path 250 in the third casing 204 as described later, so that the coolant entering the pump chamber 180 is pressure-fed to the inner-unit flow path 250 by the rotation of the rotary vane 172.

In the cell auxiliary unit 200A according to the embodiment, the transmission mechanism 230A is accommodated in the gear chamber 203a of the second casing 203, which is connected with the casing base 202 on the side opposite to the first casing 201. As shown in FIGS. 5 and 8, the transmission mechanism 230A has a pump driven gear 173, in addition to a motor drive gear 232 and a driven gear 233 for transmitting the motor driving force of the motor 210A to the compressors 130A. The synchronizing gears 231 of the compressors 130A are accommodated in the gear chamber 202a of the casing base 202. The casing base 202 requires the pump chamber 180 and the supporting structure for the pump rotating shaft 171. The effective use of the casing base 202 in the thickness direction (formation of the gear chamber 202a for accommodating the synchronizing gears 231) allows for the thickness reduction of the second casing 203 and achieves space-saving.

The transmission mechanism 230A of such gear structure enables the rotation of a motor driveshaft 212 to be transmitted to the rotating shaft 131 with the driven gear 233 through engagement of the motor drive gear 232 and the driven gear 233. The rotation of the motor driveshaft 212 is subjected to the acceleration control as described above with reference to the cell auxiliary unit 200 and is transmitted to the two compressors 130A. The transmission mechanism 230A also enables the rotation of the driveshaft 212 to be transmitted to the pump rotating shaft 171 of the circulation pump 170A through engagement of the motor drive gear 232 with the pump driven gear 173. Such transmission of the rotation rotates the rotary vane 172 of the circulation pump 170A to pressure-feed the coolant. In this embodiment, the rotation speed of the motor 210A is set to be suitable for the coolant pressure-feed condition required for the circulation pump 170A.

The second casing 203 for accommodating the motor drive gear 232, the driven gear 233 and the pump driven gear 173 has the outer shape connecting part of the outer shell of the third casing 204 for the motor with part of the outer shell of the casing base 202 as shown in FIG. 8. The second casing 203 has a coolant communication path 177 continuous from the casing base 202, which is stacked below the second casing 203 in FIG. 8.

The third casing 204 includes a hollow inner casing 204a with an open end on one side adjacent to the second casing 203 and a closed end on the other side, and a casing outer wall 204b surrounding the inner casing 204a. The casing outer wall 204b forms the outer shell of the motor 210A. The third casing 204 has the inner-unit flow path 250 (FIG. 1) formed between the inner casing 204a and the casing outer wall 204b and is joined with the second casing 203 to accommodate the motor 210A in the inner casing 204a. The respective ends of the motor driveshaft 212 with a rotor 213 in the motor 210A are supported by means of a bearing 214 incorporated in the second casing 203 and a bearing 215 incorporated in a closed wall 204c of the third casing 204. The motor driveshaft 212 has one end extended to the gear chamber 203a of the second casing 203 and is fastened to the motor drive gear 232 in the gear chamber 203a. The motor 210A has the similar structure to that of the motor 210 described above and is thus not explained in detail here.

The third casing 204 for accommodating the motor 210A forms the outer shell of the motor and is stacked on the second casing 203 as shown in FIG. 9, such that the coolant communication path 177 is continuous from the casing base 202 and the second casing 203. The third casing 204 has the inner-unit flow path 250 formed in an arc shape separate at the lower end (in the drawing) along the inner casing 204a. The coolant communication path 177 is provided on one bottom end of the arc-shaped inner-unit flow path 250. A coolant hole 178 for the coolant outflow is formed on the other bottom end of the inner-unit flow path 250. This coolant hole 178 is located on the front side of the sheet face of FIG. 9 and is formed in the closed wall 204c in FIG. 5. The third casing 204 has a cable seat 209 at the step of the casing outer wall 204b, wherein the inside of the casing beyond the cable seat 209 is used as the cabling area. In the cell auxiliary unit 200A, the first to the third casings and the casing base 202 are all aluminum die-cast parts and are integrated via sealing members and fastened by means of bolts.

Like the cell auxiliary unit 200, the cell auxiliary unit 200A has the compressors 130A and the motor 210A located inside the first to the third casings and the casing base 202 and arranged to be opposed to each other across the transmission mechanism 230A, wherein the motor driveshaft 212 is provided to face the rotating shafts 131 of the compressors 130A. In this cell auxiliary unit 200A, the circulation pump 170A is accommodated in the first casing 201 for the compressors 130A, such that the pump rotating shaft 171 is arranged in parallel with the rotating shafts 131. The motor driving force is transmitted to the circulation pump 170A through engagement of the pump driven gear 173 with the motor drive gear 232. Such arrangement is implemented by joining the respective casings as described above.

Figure 10:
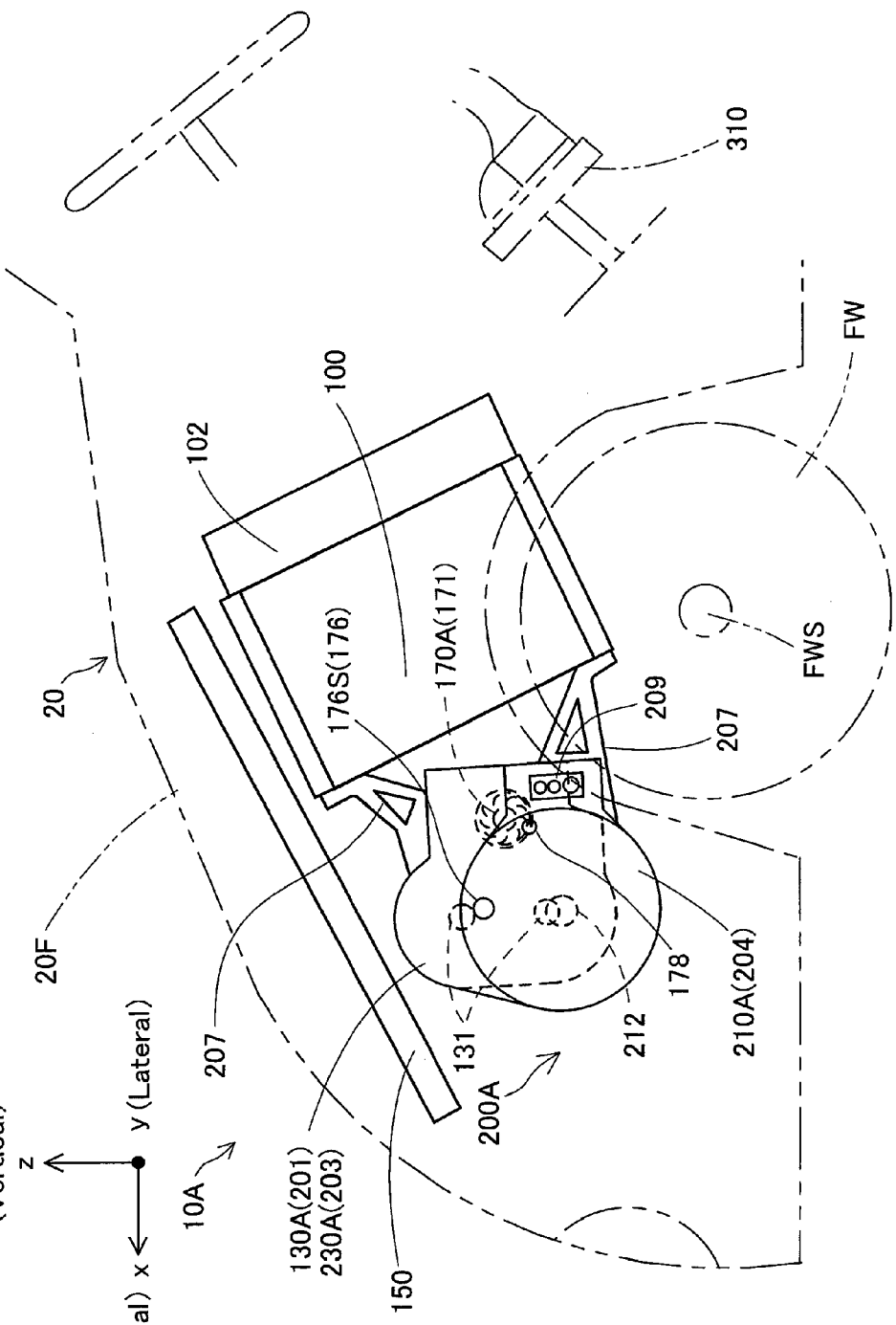
FIG. 10 corresponding to FIG. 3 is a side view schematically illustrating the process of mounting the cell auxiliary unit 200A on the vehicle.

The process of mounting the cell auxiliary unit 200A on the vehicle is described below. FIG. 10 corresponding to FIG. 3 is a side view schematically illustrating the process of mounting the cell auxiliary unit 200A on the vehicle. FIG. 11 corresponding to FIG. 4 is a top view schematically illustrating the process of mounting the cell auxiliary unit 200A on the vehicle.

As illustrated, the cell auxiliary unit 200A of this embodiment is directly fastened to the fuel cell 100 by means of fixation legs 207 and is installed with the fuel cell 100 in the inclined installation attitude in the lower region below the hood 20F, which is the forward portion of the vehicle body 20, in the fuel cell vehicle 10A. This ensures the effective use of the lower region below the hood 20F. The cell auxiliary unit 200A is placed on the more forward side in the vehicle than the fuel cell 100, and a base part 102 is attached to the other side of the fuel cell opposite to the cell auxiliary unit 200A. In the cell auxiliary unit 200A, the coolant outlet 176 is located on the upper side of the unit casing in the installation attitude, and the coolant hole 178 and the cable seat 209 have the hidden arrangement, similarly to those of the cell auxiliary unit 200 described above.

The cell auxiliary unit 200A of the above structure has the motor 210A and the compressors 130A arranged to be opposed to each other, like the cell auxiliary unit 200, and accordingly has the advantageous effects described above. The cell auxiliary unit 200A has the circulation pump 170A placed in the first casing 201 and the casing base 202 for the compressors 130A, whilst omitting the fourth casing 205 for the circulation pump 170 in the cell auxiliary unit 200. In the transmission mechanism 230A for transmitting the motor driving force to the circulation pump 170A, the pump driven gear 173 engages with the motor drive gear 232, which also engages with the driven gear 233 for power transmission to the compressors 130A. This arrangement reduces the total length in the axial direction of the rotating shafts 131 and the motor driveshaft 212 facing each other and thus enables size reduction of the cell auxiliary unit 200A.

The foregoing has described the invention in detail with reference to the illustrative embodiments. The invention is, however, not limited to the above embodiments, but a multiplicity of variants and modifications may be made to the embodiments without departing from the scope of the invention. For example, according to the above embodiment, the cell auxiliary unit 200 including the compressor 130 and the motor 210 arranged to be opposed to each other is mounted, along with the fuel cell 100, on the vehicle. This arrangement of the invention is similarly applicable to a power generation facility having a motor in addition to the fuel cell 100, a compressor for gas supply and a circulation pump for cooling down the fuel cell. This arrangement is applicable to a system including any gas-consuming device that requires both the gas supply and the cooling.

What is claimed is:

1. A gas consuming system including: a gas supply system configured to supply a gas to a gas consuming device; and a cooling system configured to circulate a coolant through a coolant flow path passing through the gas consuming device and cool down the gas consuming device by the circulated coolant, the gas consuming system comprising:
a gas supply device included in the gas supply system and provided to have a rotary member rotating for supply of the gas;
a coolant supply device included in the cooling system and provided to have a rotary member rotating for circulation of the coolant; and
a motor provided as a common driving source for the gas supply device and the coolant supply device, wherein
the motor and the gas supply device are arranged to be opposed to each other across a transmission mechanism provided to transmit a driving force of the motor to the gas supply device, such that a motor driveshaft of the motor is located to face the rotary member of the gas supply device, and
the coolant supply device is placed to transmit the driving force of the motor from the motor driveshaft of the motor to the coolant supply device directly or via the transmission mechanism.

2. A fuel cell system including: a fuel cell configured to generate electric power while consuming a supplied fuel gas and a supplied oxygen-containing oxidizing gas; gas supply systems for both the fuel gas and the oxidizing gas; and a cooling system configured to circulate a coolant through a coolant flow path passing through the fuel cell and cool down the fuel cell by the circulated coolant, the fuel cell system comprising:

a gas supply device included in an oxidizing gas supply system or supply system of the oxidizing gas and provided to have a rotary member rotating for supply of the oxidizing gas;

a coolant supply device included in the cooling system and provided to have a rotary member rotating for circulation of the coolant; and a motor provided as a common driving source for the gas supply device and the coolant supply device, wherein the motor and the gas supply device are arranged to be opposed to each other across a transmission mechanism provided to transmit a driving force of the motor to the gas supply device, such that a motor driveshaft of the motor is located to face the rotary member of the gas supply device, and the coolant supply device is placed to transmit the driving force of the motor from the motor driveshaft of the motor to the coolant supply device directly or via the transmission mechanism.

3. The fuel cell system according to claim 2, wherein the driving force of the motor, which is driven to enable the coolant supply device to have an operating condition required for circulation of the coolant, is transmitted to the coolant supply device, and the transmission mechanism causes the gas supply device to have an operating condition required for supply of the oxidizing gas, through acceleration control of a rotation speed of the motor.

4. The fuel cell system according to claim 2, further comprising:

a casing with legs, wherein the motor and the gas supply device arranged to be opposed to each other across the transmission mechanism are placed, along with the coolant supply device, in the casing, and the casing is fastened to the fuel cell via the legs.

5. The fuel cell system according to claim 4, wherein an inner-casing flow path for the coolant is formed in a motor surrounding wall of the casing surrounding the motor and is arranged to pass through the coolant supply device.

6. The fuel cell system according to claim 5, wherein the inner-casing flow path has a plugged coolant outlet, which is located on an upper side of the casing in a state that the casing is installed at an installation position.

7. A vehicle, on which the fuel cell system according to claim 2 is mounted, wherein the motor driveshaft of the motor, a rotating shaft of the coolant supply device and a rotating shaft of the gas supply device are arranged across a vehicle width direction to be parallel to one another, and the fuel cell, the motor, the coolant supply device and the gas supply device are placed in a hood lower region below a hood of the vehicle.

8. The vehicle according to claim 7, wherein the fuel cell system is mounted on the vehicle, such that an outer shell of the motor is located in a vehicle forward portion in the hood lower region.

* * * * *

UNITED STATES PATENT AND TRADEMARK OFFICE
CERTIFICATE OF CORRECTION

PATENT NO.         : 8,613,334 B2                                  Page 1 of 1
APPLICATION NO.   : 13/499646
DATED              : December 24, 2013
INVENTOR(S)        : Daisuke Masaki, I It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twenty-second Day of September, 2015

Michelle K. Lee
*Director of the United States Patent and Trademark Office*